United States Patent Office 3,087,806
Patented Apr. 30, 1963

3,087,806
PROCESS FOR THE PRODUCTION OF HIGH-YIELDING SOYBEAN PLANTS
Jerome L. Martin, Terre Haute, Ind., assignor to Commercial Solvents Corporation, New York, N.Y., a corporation of Maryland
No Drawing. Filed Sept. 6, 1960, Ser. No. 53,910
3 Claims. (Cl. 71—29)

My invention relates to a process for producing soybeans, and more particularly my invention relates to a process for producing soybeans in high yields by treating the soybean plant with urea phosphate.

In order to produce high-yielding soybean plants large amounts of nitrogen are required. It has long been known that the yield of soybean plants depends on large quantities of available nitrogen. Nearly all of the nitrogen available to soybean plants is obtained from nitrogen fixed by Rhizobium japonicum nitrogen-fixing bacteria and residual nitrogen. Repeated attempts to increase the yields of soybean plants by adding chemical nitrogen to the soil have resulted in failure. It has been discovered that the addition of a chemical source of nitrogen to the soil actually destroys the ability of nitrogen-fixing bacteria to supply nitrogen to the soybean plant. Since it has not been previously possible to economically produce higher-yielding soybean plants by the use of chemical sources of nitrogen without destroying the effectiveness of nitrogen-fixing bacteria, it is necessary to grow soybean plants in highly fertile soils containing large quantities of residual nitrogen and nitrogen-fixing bacteria.

I have now discovered a process whereby a chemical source of nitrogen can be supplied to soybean plants without depriving the plants of nitrogen obtained from nitrogen-fixing bacteria. I have also discovered that my process increases the yields of the soybean plant. My new process is especially advantageous in soils which do not contain nitrogen-fixing bacteria in quantities necessary to supply proper amounts of nitrogen even to produce normal yielding soybean plants. My process allows the proper growth of high-yielding soybean plants while still making use of the nitrogen-fixing bacteria in the soil thus permitting use of soils in which soybeans could not previously be economically grown.

I have now discovered that improved yields of soybeans can be obtained by contacting the soybean plant with an aqueous solution of urea phosphate.

The exact concentration of the solution of urea phosphate to be utilized in my invention will vary depending on the stage of growth of the plant, the quantity of nitrogen-fixing bacteria in the soil, the frequency with which it is desired to treat the plant, etc. In general, however, solutions containing as low as 0.1% of urea phosphate are effective in producing higher yielding soybean plants while solutions containing more than 2% urea phosphate tend to harm the plant. I prefer, however, to use aqueous solutions containing from about 0.2 to about 1.0% urea phosphate.

The aqueous solutions containing urea phosphate of my invention can be applied to the soybean plant by any suitable means. One method is by spraying a fine mist of the aqueous solution directly on the plant, thereby avoiding waste of the solution by drippage from the plant and avoiding unnecessary contact of the solution with the soil.

The following examples are offered to illustrate the usefulness of my new process, however, I do not intend to be limited to the particular portions, procedures, etc., which are shown. Rather, I intend to include equivalents within the scope of my invention evident to those skilled in the art.

EXAMPLE I

Three groups of soybean plants, each group containing three plants, were grown in soil rich in nitrogen-fixing bacteria for a period of eighteen weeks under identical conditions with the exception that nitrogen in the form of ammonium nitrate was added to the soil in which the first group of plants was grown and an aqueous spray containing 0.3% urea phosphate was applied twice weekly to the leaves of the plants in the second group. At the end of the eighteen-week period, the soybeans from the three groups of plants were removed from the plants and weighed. The table below shows a comparison of the average weights of the beans for the three groups of plants thus demonstrating the effectiveness of my urea phosphate treatment.

Table I

| Group 1 (Average weight of beans from three plants grown in soil containing nitrogen-fixing bacteria and ammonium nitrate) | Group 2 (Average weight of beans from three plants grown in soil containing nitrogen-fixing bacteria, the plants having been sprayed twice weekly with 0.3% aqueous urea phosphate) | Group 3 (Average weight of beans from three plants grown in soil containing nitrogen-fixing bacteria) |
|---|---|---|
| 19.74 grams | 60.46 grams | 18.43 grams |

Now having described my invention, what I claim is:

1. A process for the production of soybeans in improved yields which comprises treating the leaves of soybean plants at least twice weekly with an aqueous solution containing from about 0.3 to about 2% urea phosphate.

2. The process of claim 1 wherein the amount of urea phosphate is from 0.3 to 1%.

3. The process of claim 1 wherein the aqueous solution or urea phosphate is applied in the form of a fine spray.

References Cited in the file of this patent
UNITED STATES PATENTS

| | | |
|---|---|---|
| 1,280,650 | Bosch | Oct. 8, 1918 |
| 1,559,518 | Breslauer et al. | Oct. 27, 1925 |
| 2,663,629 | Semon | Dec. 22, 1953 |